US006950416B1

(12) United States Patent
Feuerstein et al.

(10) Patent No.: US 6,950,416 B1
(45) Date of Patent: Sep. 27, 2005

(54) EMBEDDED DIGITAL BEAM FORMING

(75) Inventors: Martin J. Feuerstein, Redmond, WA (US); Sheila Reynolds, Bellevue, WA (US); Yingjie Li, Redmond, WA (US); Mark Reudink, Seattle, WA (US); Douglas O. Reudink, Kirkland, WA (US)

(73) Assignee: Kathrein-Werke KG, Rosenheim (DE)

( * ) Notice: Subject to any disclaimer, the term of this patent is extended or adjusted under 35 U.S.C. 154(b) by 0 days.

(21) Appl. No.: 09/498,204

(22) Filed: Feb. 4, 2000

Related U.S. Application Data

(63) Continuation-in-part of application No. 08/924,741, filed on Sep. 5, 1997.

(51) Int. Cl.[7] .............................................. H04J 13/00
(52) U.S. Cl. ...................................... 370/335; 370/342
(58) Field of Search .............................. 370/310, 328, 370/334, 335

(56) References Cited

U.S. PATENT DOCUMENTS

| 5,576,717 | A | | 11/1996 | Searle et al. ................. 342/373 |
|---|---|---|---|---|
| 5,594,941 | A | | 1/1997 | Dent ........................... 370/310 |
| 5,621,752 | A | | 4/1997 | Antonio et al. .............. 375/200 |
| 5,628,052 | A | | 5/1997 | DeSantis et al. ............. 370/334 |
| 5,736,959 | A | | 4/1998 | Patterson et al. ............ 342/354 |
| 5,757,767 | A | | 5/1998 | Zehavi ......................... 370/320 |
| 5,764,630 | A | | 6/1998 | Natali et al. ................. 370/335 |
| 5,838,669 | A | | 11/1998 | Gerakoulis ................... 370/320 |
| 5,848,060 | A | | 12/1998 | Dent ........................... 370/281 |
| 5,909,460 | A | * | 6/1999 | Dent ........................... 375/130 |
| 5,930,243 | A | * | 7/1999 | Parish et al. ................. 370/334 |
| 6,192,256 | B1 | * | 2/2001 | Whinnett ................. 455/562.1 |
| 6,615,024 | B1 | * | 9/2003 | Boros et al. ................... 455/69 |

FOREIGN PATENT DOCUMENTS

| EP | 0639035 | 2/1995 | ............ H04Q 7/36 |
|---|---|---|---|
| EP | 0725498 | 8/1996 | ............ H04B 7/36 |
| EP | 0774700 | 6/1997 | ............ H04Q 7/36 |
| WO | WO 96/37974 | * 11/1996 | ............ H04B 7/04 |

OTHER PUBLICATIONS

Mahmoudi et al. "Adaptive Sector Size Control in a CDMA System Using Butler Matrix". IEEE. Jul. 1999. pp. 1355-1359.*

Tsoulos et al. "Performance Enhancement of DS-CDMA Microcellular Networks with Adaptive Antennas". IEEE. Apr. 28, 1996-May 1, 1996. pp. 1086-1090.*

* cited by examiner

*Primary Examiner*—Chi Pham
*Assistant Examiner*—Derrick W. Ferris
(74) *Attorney, Agent, or Firm*—Fulbright & Jaworski LLP

(57) ABSTRACT

Disclosed is a system utilizing a multi-beam antenna that switches the beams to a CDMA demodulation receiver in such a way that the best beams are selected. The transmit path takes the traffic channel outputs from the CDMA modulators and maps each traffic channel to the subset of beams that have the best path to the mobile in the forward link. Accordingly, the system operates to reduce interference on both the forward and reverse links, as well as to increase the capacity of both the forward and reverse links. The system also is capable of providing flexible dynamic shaping of the cell and the sectors by mapping the appropriate overhead channels on the forward link and the reverse link in different combinations of beams to sectors in order to shape the cell. Adaptive arrays may be utilized to form radiation patterns, for which the azimuthal width and/or length of a sector may be adjusted by way of adjustments of the relative amplitude and phase of signal components of signals at antennas of a phased array adaptively controlled according to communication parameters such as information indicating the quality of the communication channel on that sector, interference from other channels or the number of calls serviced in particular sectors.

45 Claims, 3 Drawing Sheets

EMBEDDED DIGITAL BEAM FORMING

RELATED APPLICATIONS

The present application is a continuation-in-part of co-pending, commonly assigned, U.S. patent application Ser. No. 08/924,741, entitled "EMBEDDED DIGITAL BEAM SWITCHING", filed Sep. 5, 1997, which application is hereby incorporated by reference. Reference is also hereby made to the following co-pending and commonly assigned U.S. patent applications: Ser. No. 09/384,306, entitled "ANTENNA DEPLOYMENT SECTOR CELL SHAPING SYSTEM AND METHOD", filed Aug. 26, 1999; Ser. No. 08/924,285, entitled "ANTENNA DEPLOYMENT SECTOR CELL SHAPING SYSTEM AND METHOD", filed Sep. 5, 1997; Ser. No. 08/902,057, entitled "SIGNAL FEED MATRIX LPA REDUCTION SYSTEM AND METHOD", filed Jul. 27, 1997; "SIGNAL FEED MATRIX AMPLIFIER REDUCTION SYSTEM AND METHOD", Ser. No. 08/901,932 now issued as U.S. Pat. No. 5,917,371; the disclosures of which are incorporated herein by reference.

TECHNICAL FIELD

This invention relates in general to multi-beam antennas applied to direct sequence CDMA. More specifically, this invention relates to systems and methods for switchably combining multiple beam signals for provision to sector inputs of a CDMA transceiver and for switchably coupling sector outputs of a CDMA transceiver to multiple antenna beams.

BACKGROUND

In a spread spectrum CDMA system, multiple communication units, or mobile systems, operate on a single frequency separated only by a particular CDMA code and/or a CDMA code delay defining a CDMA channel. Typically these CDMA channels are available throughout a cell, or sector of the cell. However, radiation of a CDMA channel within an area of the cell in which the particular communication unit assigned to the CDMA channel is not operating only serves to increase the interference energy experienced by other communication units operating on that frequency.

In order to obtain performance from a multi-beam antenna with a CDMA base station, the system must be able to despread and separate the transmitted and received signals that are using different codes or different code delays. In this way, it would be possible to restrict radiation of a particular CDMA channel to only within an area most likely to actually be utilized by a communication unit assigned to the CDMA channel. However, in order to isolate transmission of a CDMA channel to a particular area within the cell, a multi-beam antenna system is preferably utilized.

Accordingly, there exists a need in the art for a system and method for equipping a CDMA base station to dynamically restrict communication with communication units to selected beams of a multi-beam antenna system. However, a problem exists in the use of such a multi-beam antenna with a typical CDMA base station in that the traditional inputs and outputs from such a base station are at the radio frequency level. They contain a composite of all of the transmitted and received signals on the same frequency. It is difficult, if not impossible, to separate one user signal, or channel from another unless the system obtains information about the transmitted and received codes and the timing of those codes so that the traffic channel signals for one user can be broken apart from the signals of another user.

In the literature on CDMA systems, there is work that has been published and examined for integrating or combining multi-beam antennas with CDMA systems on the reverse link because it is relatively easy to model and relatively easy to get an estimate of the interference environment and the channels on the reverse path. It shall be appreciated that, unlike the reverse link, there are significant problems in modeling the forward link of a CDMA system. Likewise, getting estimates of the interference environment and the channel conditions of the forward link of a CDMA system is very difficult. Accordingly, a need exists in the art for a scheme of simplifying the processing on the forward link while still getting an interference reduction and a capacity gain on the forward link.

A need in the art exists for a system and method adapted to continuously switch the best signals from a multi-beam antenna system into the demodulation receiver of a CDMA base station in order that the receiver is able to make best use of all of the signals that are available from this multi-beam antenna.

A further need exists in the art for a system and method adapted to update selection of the best signals from a multi-beam antenna system in such a way that the channel environment and the motion of the mobile does not change too dramatically over the time in which the switching is accomplished.

A need also exists in the art for a system and method adapted in the forward link to transmit only on a minimum number of beams that have a good communications link to the mobile. Accordingly, transmit energy is not wasted on beams that are not radiating in the direction of the mobile and, thus reduction of overall interference on the forward link and improved capacity of the forward link is experienced.

SUMMARY OF THE INVENTION

These and other objects, features and advantages are achieved in a system and method which in a preferred embodiment utilizes embedded hardware in a CDMA base station in order to accomplish beam switching based on despread signals. Accordingly, in the receive path, the invention uses the normal receive chain typically found in a CDMA cell site. Additionally, the invention is able to use the demodulation receiver typically found in a direct sequence CDMA cell site.

According to a preferred embodiment of the present invention, a CDMA cell site is modified to insert a digital switching function in the baseband receive signals prior to being despread by the receiver. On the received path, the elements that are preferably inserted in the base station are a digital switch function and a control function to operate the switch.

The present invention operates to take the inputs from a typical multi-beam antenna, a preferred embodiment having twelve such beams, and switch those beams so that the best beams, the preferred embodiment switching six such beams, are always routed into the cell site demodulation. Preferably, the switching of the present invention is based on the output from the demodulation receiver. The demodulation receiver is continuously providing estimates of a signal interference ratio on the, typically 6 (3 sectors times 2 diversity inputs per sector), inputs that it contains. The digital switch function or the digital switch matrix is updated based on those six signal interference ratio reports.

On the transmit path, the present invention uses the normal modulator function in a CDMA base station to map the traffic channel for providing CDMA channels only to beams or to beams on sectors that have the best link to the mobile assigned to the CDMA channel. The channel element modulator outputs for each traffic channel are routed to beams that are in strongest contact with the mobile.

It shall be appreciated that, according to the present invention, the transmit chain, the conversion to radio frequency and the amplification, are exactly as you would have in a typical base station. The only part of this invention that is inserted in the transmit path is a digital mapping function at baseband to select beams for each user.

On the transmit path, for some CDMA implementations, there would be overhead channels, pilot synchronization and paging channels, that require simulcast transmission over multiple beams. The digital switch matrix on the transmit path handles this by taking outputs from the channel elements that are generating these overhead channels, pilot paging synchronization, and routing those to the appropriate beams on each sector in a simulcast fashion. Accordingly, a composite radiation pattern is generated, i.e., a radiation pattern is synthesized that approximates what a traditional sector antenna would cover.

In a preferred embodiment, the multiple antenna beams utilized according to the present invention to form the composite radiation pattern are provided by using adaptive array circuitry. Accordingly, the shape of a particular beam or sector may be selected by adjusting the relative amplitudes and phases of signal components of the signals received from the channel elements at multiple inputs to an antenna system. For example, the amplitudes and phases of the signal components may be adaptively controlled according to communication parameters such as information indicating the quality of the communication channel of particular sectors, interference from other channels or the number of calls serviced in particular sectors. Therefore, signal components of signals for each sector associated with antenna elements of the antenna array may be manipulated to selectively and independently map sector or other beam patterns.

The adaptive array circuitry may be utilized to dynamically form radiation patterns for which the azimuth and/or length of a sector may be adjusted to provide the desired coverage and quality of signals. Thus, by adjusting the relative amplitude and/or phase of signal components of signals as provided to antenna elements of a cell site antenna array, the azimuth of a sector may be changed. If a communication device experiences poor signal quality or causes interference with another communication device, then it may be handed off to an adjacent beam, by adjusting the azimuth of the beam or beams. By forcing a hand off of a communication device from an otherwise full sector to another sector such as by decreasing the size or changing the azimuthal direction of a beam radiation pattern currently serving the communication device to thereby exclude the communication device from the adjusted beam, signal quality may be increased in a communication system, such as in a CDMA system.

Technical advantages of the present invention on the forward link include: reducing the average transmittal power required for mobile; improving the capacity on the forward link; reducing overall interference levels on the forward link; reducing the probability of a sector running out of transmit power or going into overload conditions; and reducing the probability the sector has traffic beyond its handling capacity.

Technical advantages of the present invention on the reverse link include: reducing the overall network wide interference levels; and improving the signal interference ratio achievable at the cell site for each of the users.

Moreover, technical advantages of the present invention are realized in originating and terminating calls by improving the probability that a given mobile has a single dominant server for a cell site or has a small number of dominant servers, so to reduce the number of areas where multiple servers, such as five or six servers, have the potential of being a serving cell site for any particular user.

Another technical advantage of the present invention is to reuse as many of the component parts of a traditional CDMA base station as possible. On the receive side the present invention uses the normal receive chain of components and the modulator circuitry. Likewise, on the transmit side the present invention uses the modulator circuitry and the transmission path chain that exists in a normal cell site, inserting the minimum number of components possible to integrate the multi-beam antenna with the base station.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

It is helpful, in understanding the inventive concept of the present invention, to understand the overall flow of call data through a cell site or base transceiver station (BTS) of the present invention. Accordingly, a high level block diagram of BTS 10 adapted according to a preferred embodiment of the present invention is illustrated in FIG. 1.

Directing attention to FIG. 1, the flow of call data will be described. The top portion of FIG. 1 shows antennas 18-1 through 18-12 where the received signal enters the cell site. In the illustrated preferred embodiment, twelve narrow beam antennas disposed to provide a substantially non-overlapping 360° composite radiation pattern are utilized. However, it shall be appreciated that any number of antenna beams may be utilized according to the present invention.

Figure 1:
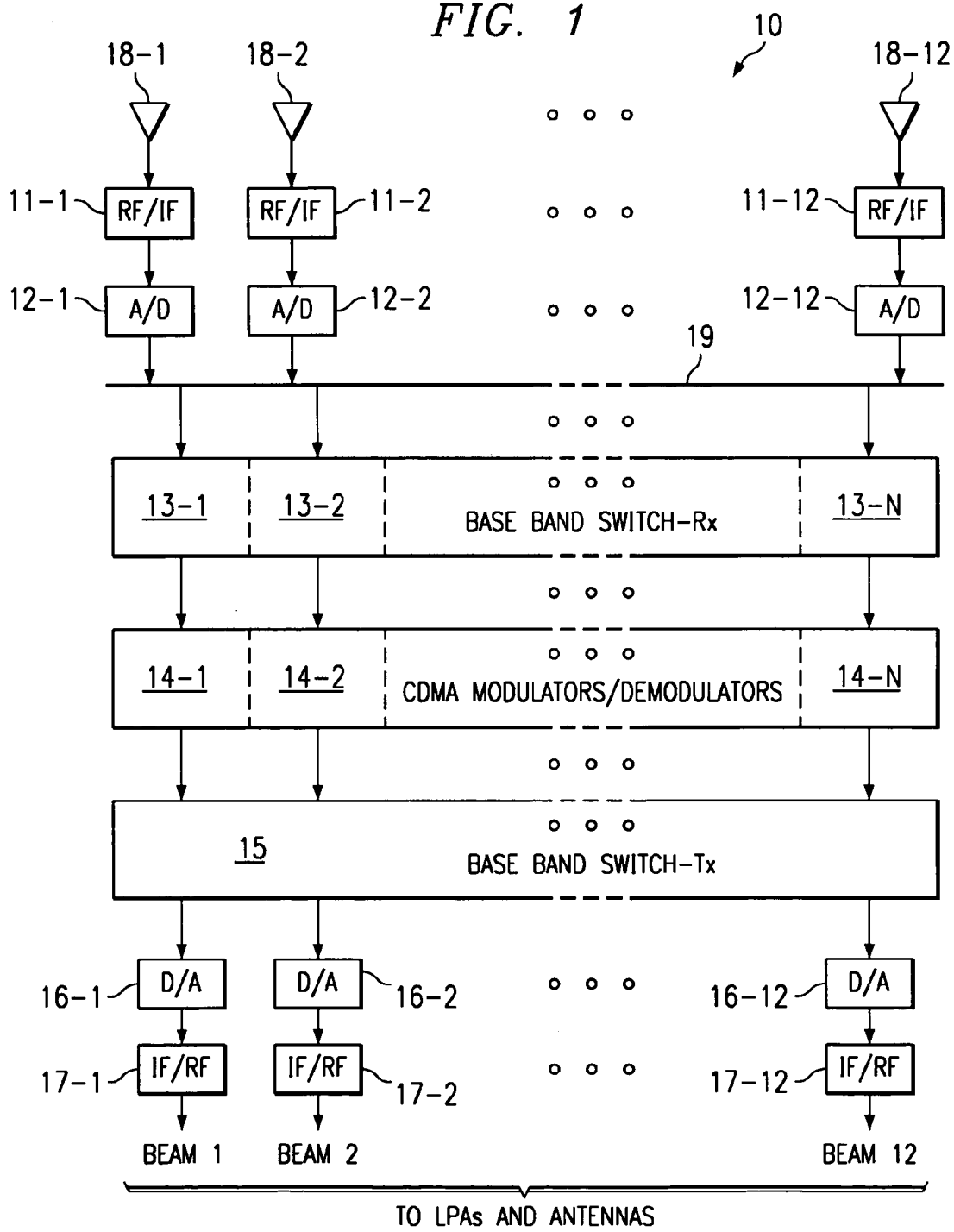
FIG. 1 illustrates a high level block diagram of a base transceiver station of the present invention.

Furthermore, a multi-beam antenna may be utilized rather than the discrete antennas illustrated in FIG. 1. Accordingly, as used hereinafter, the terms multi-beam antenna and multi-beam system shall be defined to include both an antenna providing multiple beams and a combination of discrete antennas each adapted to provide individual antenna beams.

The signals received by each of antennas 18-1 through 18-12 pass through radio frequency to intermediate frequency conversion circuitry, RF/IF converters 11-1 through 11-12 respectively. Thereafter, the signals are passed to analog digital conversion units, A/D converters 12-1 through 12-12 respectively. Accordingly, there is a chain of antenna, RF/IF converter, and A/D converter for each of the twelve antenna beams of the multi-beam system.

It shall be appreciated that the A/D converters of the present invention may include circuitry in addition to that required for analogue to digital conversion. For example, Automatic Gain Control (AGC) circuitry may be included to provide a receive signal having a desired power level. Likewise, interference canceling circuitry may be included to improve receive signal quality. Of course, such additional circuitry may be disposed at other points in the signal path rather than within the analogue to digital converters, if desired.

The output of the A/D converters 12-1 through 12-12 feed into a baseband receive switch, illustrated as a bank of switch matrix units 13-1 through 13-N. There is a switch unit for each of the N traffic channels in use at the cell site. Preferably, the signal received by any of antennas 18-1 through 18-12 is available for switching by any of switch matrix units. Accordingly, means for providing the received signals associated with each of the antenna beams to each of the switch matrix units, such as digital bus 19 routing all twelve beam receive signals to each one of the baseband receive switch units, is provided. Access to the receive signals at each CDMA demodulator is accomplished by having all twelve of the receive chains, from each of the receive beams, routed to digital bus 19 so that each of the baseband receive switching elements 13-1 through 13-N have access to all the signals input into digital bus 19. With this arrangement each of the switch elements can access all twelve of the receive signals simultaneously and, thus, pass any desired signal to an associated CDMA demodulator element.

The switch matrix units 13-1 through 13-N feed signals into a CDMA demodulator or CDMA receiver, illustrated as a part of CDMA modulators/demodulators 14-1 through 14-N. Each CDMA demodulator despreads the signal provided to it by its associated switch matrix unit, and decodes the traffic data that is transmitted on the reverse link from the mobile to the cell site. This traffic data is then transferred to the cellular network for use in providing cellular communications as is well known in the art.

The baseband receive switch and CDMA modulator/demodulator include elements that are assigned to each traffic channel or each user that is active in the cell site depicted in BTS 10. Accordingly, each traffic channel would be assigned to one of the baseband receive switch elements and one of the CDMA modulator/demodulator elements. As such, the signal received by any of antennas 18-1 through 18-12 is available for switching to any of the CDMA modulator/demodulator elements and, therefore, a traffic channel appearing in any of the antenna beams may be switched to a particular assigned CDMA modulator/demodulator element.

On the transmit side or forward link, the CDMA modulator or CDMA transmitter, illustrated as a part of CDMA modulators/demodulators 14-1 through 14-N, feeds traffic data out to a baseband transmit switch, illustrated as baseband transmit switch 15, that routes traffic channel data only on specific selected antenna beams. The particular antenna beams to which a particular traffic channel is routed is selected to provide the best paths from the cell site to the mobile. For example, if the mobile is in handoff with multiple sectors of the cell site, then the baseband transmit switch 15 routes the signals associated with that particular traffic channel to the appropriate sectors, i.e., appropriate antenna beams, at the cell site. It shall be appreciated, in a preferred embodiment of the present invention, that baseband transmit switch is adapted with a number of inputs and outputs to provide the ability to switch any output of CDMA modulators/demodulators 14-1 through 14-N to any antenna beam available at the cell site. Accordingly, as in the combination of bus 19 and the baseband receive switch, there is not a one to one correspondence between the CDMA modulator inputs and antenna beam outputs of baseband transmit switch 15.

The output of baseband transmit switch 15 feeds a chain of digital analog converters, D/A converters 16-1 through 16-12. D/A converters 16-1 through 16-12 in turn feed intermediate frequency to radio frequency converters, IF/RF converters 17-1 through 17-12 respectively. Accordingly, there is a separate digital to analog converter and intermediate frequency to radio frequency converter chain for each of the twelve beams of the preferred multiple beam system. After passing through the chain, the signals are radiated by the cell site for reception by the mobile units operating therein.

Preferably, radiation of the signals includes the use of amplifiers, such as linear power amplifiers (LPAs) (not shown) in the forward link signal path to provide the desired amplification of the signals. Arrangements of banks of LPAs suitable for use according to the present invention are shown in commonly assigned, U.S. patent application entitled "SIGNAL FEED MATRIX LPA REDUCTION SYSTEM AND METHOD" and U.S. patent entitled "SIGNAL FEED MATRIX AMPLIFIER REDUCTION SYSTEM AND METHOD," previously incorporated by reference herein.

The outputs of the LPAs, or IF/RF converters 17-1 through 17-12 wherein LPAs are not used, are provided to antenna elements providing the multiple beam radiation pattern. These antenna elements may be individual antennas, such as those illustrated as antennas 18-1 through 18-12, or may be a multi-beam antenna. Moreover, through the use of a duplexer, the antennas utilized in the receive signal path may also be used in the transmit signal path. For example, a duplexer could be coupled to the outputs of IF/RF 17-1 through 17-12, or the LPAs if used, and to antennas 18-1 through 18-12, respectively, in order to utilize the same antennas in both the forward and reverse links. In a preferred embodiment, an adaptive array is used to provide the desired multi-beam radiation pattern. The use of an adaptive array to provide the desired radiation pattern is discussed below with regard to FIG. 4.

Figure 2:
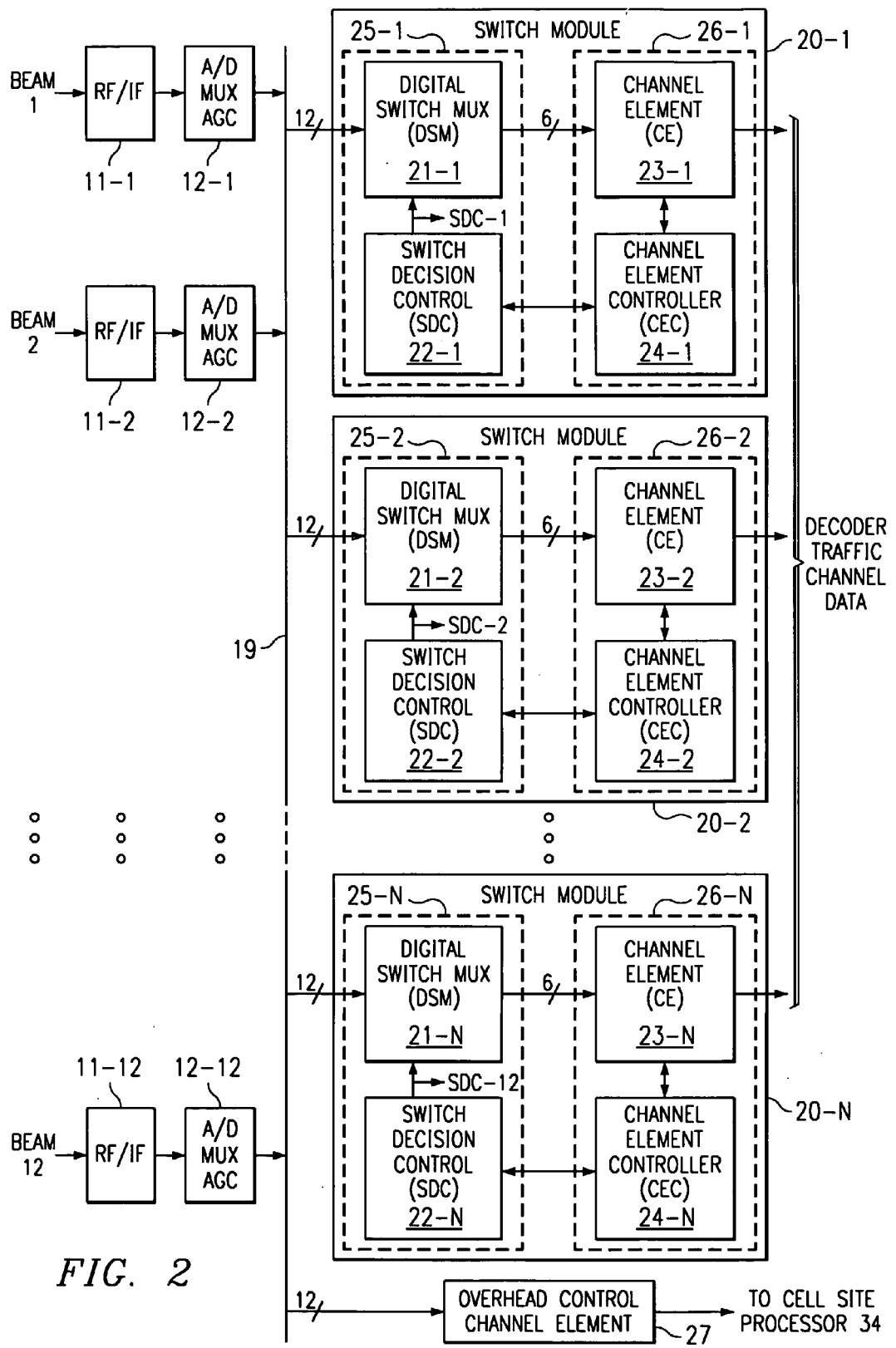
FIG. 2 illustrates a preferred embodiment of the receive signal path of the base transceiver station of FIG. 1.

Directing attention to FIG. 2, more details of the receive path illustrated in FIG. 1 are shown. As described above, the output from the twelve receive chains, RF/IF converter 11-1 and A/D converter 12-1 through RF/IF converter 11-12 and A/D converter 12-12, feed digital bus 19 which, in turn, feeds the switch elements.

FIG. 2 illustrates the elements of FIG. 1 in more detail, showing switch modules 20-1 through 20-N which include switch position control units, 25-1 through 25-N respectively, and channel element/controllers, 26-1 through 26-N respectively. It shall be appreciated that switch position control units 25-1 through 25-N are a part of switch matrix units 13-1 through 13-N, respectively, illustrated in FIG. 1. Likewise, channel element/controllers 26-1 through 26-N are a part of CDMA modulators/demodulators 14-1 through 14-N, respectively, illustrated in FIG. 1.

Elements making up switch modules 20-1 through 20-N, the interface to digital bus 19, include Digital Switch Multiplexers (DSM) 21-1 through 21-N in each of the switch modules. The DSMs take the twelve logical signals provided each switch module from digital bus 19, one from each of the beams of the multi-beam antenna, and selects, under control of switch decision control units, those beams having most desirable attributes per channel, such as a strongest signal or a highest signal to interference ratio on a traffic channel associated with the particular DSM. Preferably, the best six of the beams are selected for passing to the channel element/controllers, as illustrated in FIG. 2. Of course, other numbers of beams determined to be advantageous could be utilized according to the present invention, if desired.

Switch Decision Control (SDC) units 22-1 through 22-N, of switch modules 20-1 through 20-N respectively, interface directly with a Channel Element Controller (CEC) to supervise the switch function performed by the digital switch multiplexers. The switch decision control unit requests search data from the channel element controller, also obtaining timing information on the digital stream of data that is fed into the channel element controller.

In the preferred embodiment, the switch decision control unit compares measurements of the signal interference ratio from the despread signals being processed in the channel element controller. From this comparison, the switch decision control unit controls the coupled digital switch multiplexer to provide the best six of the twelve available inputs as signals to drive the channel element controller. Additionally, in a preferred embodiment, the SDCs also provide signals useful in controlling the forward link signal path, such as at connections SDC-1 through SDC-12.

The switch decision control unit keeps track of which demodulator elements in the channel element are actually assigned and locked on to receive paths and would not switch any of the logical inputs that were actively being demodulated. In other words, of the six inputs to the channel element, only a subset of those are going to be used at any given time and the switch decision control would only switch inactive inputs to the channel element to avoid disrupting the flow of decoded traffic channel data.

Preferably, the switch decision control units continuously update the settings of the switches in the digital switch multiplexers in order to maintain the best inputs as conditions change in the cell. In a typical cellular radio environment the updating of the digital switch multiplexer can take place on the order of every one to two seconds, which is relatively slow processing compared to the traffic channel data that is flowing through the channel element demodulator.

Switch modules 20-1 through 20-N also include channel elements (CE) 23-1 through 23-N coupled to the DSMs. The CEs despread the signals passed from the DSMs based on the user code or the user code delay. Thereafter, the CEs make a measurement of the signal's interference ratio for each of the 6 inputs, preferably as a function of time delay, and then under the supervision of CECs 24-1 through 24-N, demodulate the signal. The demodulated signal, in the form of decoded traffic channel data, is then sent to the cell site processor for processing as is well known in the art.

Digital data bus 19 also feeds a specialized set of switch modules 27, where there are preferably one or more of the specialized modules pulling off the 12 receive signals in order to process access channel information on the reverse link to detect mobiles that are trying to originate or terminate calls. The functions that are performed in 27 are similar to the functions performed in switch modules 20-1 through 20-N, with the exception that the processing is for the access channel rather than for a traffic channel.

The outputs of switch modules 20-1 through 20-N are the decoded traffic channel data that are passed on to the cell site controller and in most cases to the switching network cell site processor. Similarly, the outputs of specialized access channels switch module 27 are the decoded access channel data that are passed on to the cell site processor, such as cell site processor 34 shown in FIG. 3 and described below.

Figure 3:
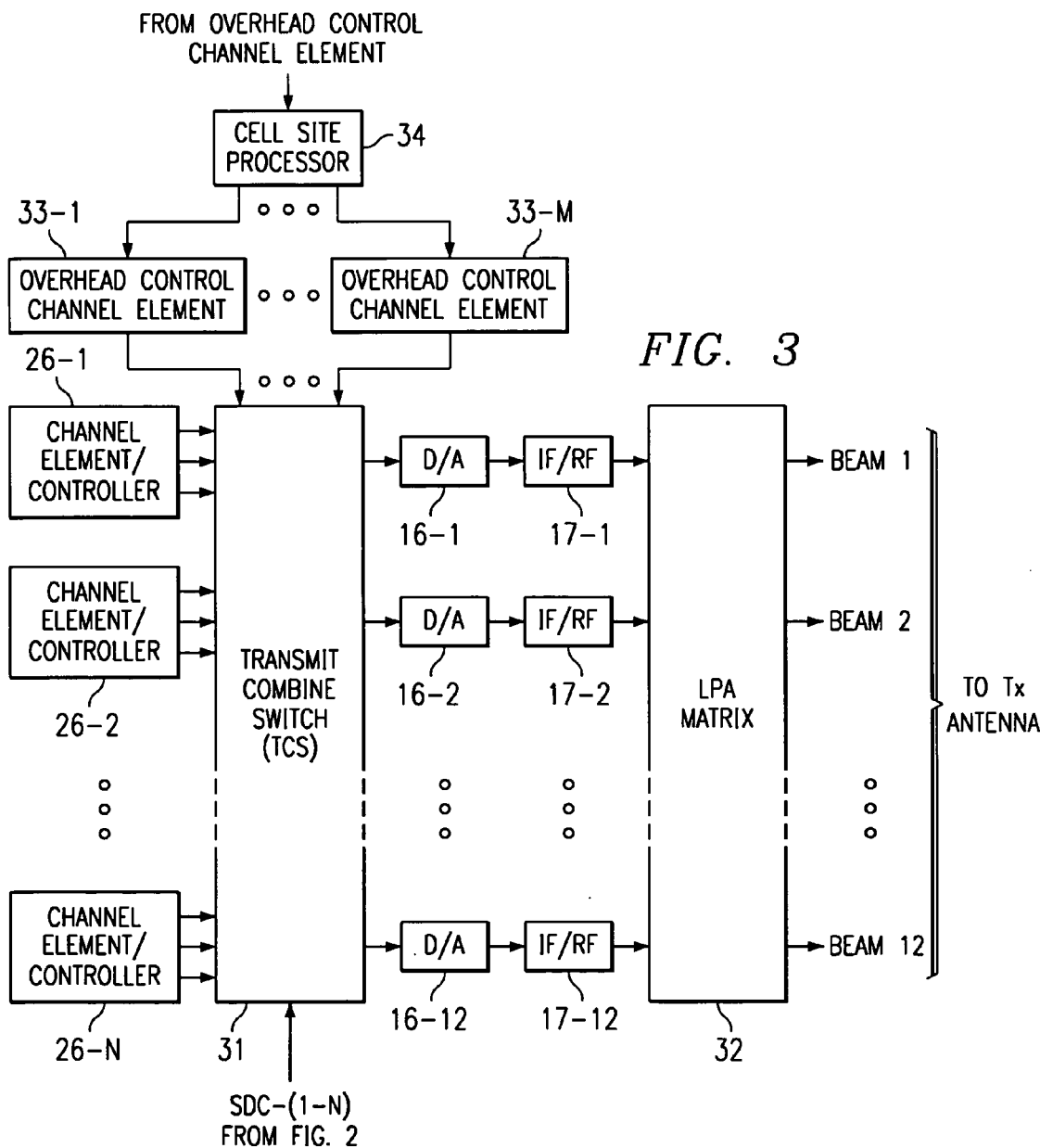
FIG. 3 illustrates an embodiment of the transmit signal path of the base transceiver station of FIG. 1.

Turning now to FIG. 3, the transmit path of a preferred embodiment of the present invention is shown in more detail. There are shown a bank of channel element/controllers 26-1 through 26-N, corresponding to those shown in FIG. 2, that feed the forward transmit path data from the mobile telephone switching office, or telephone network, down to the mobiles.

In the preferred embodiment, the output of the channel element/controller has multiple components—one for each of the sectors of the cell site. If the mobile is in handoff with more than one sector then more than one of the outputs will be used. If the mobile is in handoff with only one of the sectors of the cell then only one of those outputs will be active.

The outputs from each of the channel element/controllers 26-1 through 26-N are fed to a Transmit Combined Switch (TCS) 31. It shall be appreciated that TCS 31 of FIG. 3 is substantially the same as baseband transmit switch 15, illustrated in FIG. 1, showing additional detail. As described above with respect to baseband transmit switch 15, TCS 31 takes the traffic channel outputs from each of the channel elements and routes them to the best forward path antenna beams. Preferably, selection of the best forward path antenna beams is based on the received signal interference ratios that are provided at connection SDC-1 through SDC-N from switch decision control units 22-1 through 22-N, shown in FIG. 2, coupled to TCS 31 as shown in FIG. 3.

The beams with the best signal interference ratio are chosen by TCS 31 as the forward transmit path. In general, the TCS will pick the minimum number of beams necessary to transmit on the forward link to the mobile, in order to reduce the amount of forward link interference across the network.

TCS 31 also has inputs from overhead control channel elements 33-1 through 33-M. These specialized channel elements generate forward path signals that are to be simulcast over all of the beams for a given sector. These overhead channels may include pilot channels for synchronization of the carrier recovery at the mobile, synchronization channel for timing recovery of the mobile, and paging channel for alerting mobile to incoming calls and providing network control and parameter update information for the mobile. These overhead channels are sent into the transmit combine switch and then mapped to be a simulcast out from all of the antenna beams assigned to a given sector.

The outputs from TCS 31 feed into digital to analog converters 16-1 through 16-12, associated with each of the beams respectively, and then are fed into IF/RF conversion units 17-1 through 17-12. The outputs of the IF/RF conversion units then feed into an LPA linear power amplifier matrix 32 that drives the transmit assembly, which may include duplexers and/or antennas, for transmission of the forward link.

The forward path data for the channel elements 26-1 through 26-N as well as the overhead control channel elements 33-1 through 33-M comes from cell site processor 34. In most cases that data would be fed from the mobile telephone switching office, the telephone network, or the wire line network, to be transmitted to the mobile.

Returning again to FIG. 2, the input to channel elements 23-1 through 23-N have six logical inputs. In a typical cell site configuration, there would be 3 sectors times 2 diversity antennas for each sector, giving a total of six inputs. The input to the channel element controller has already been converted to baseband and digitized into digital samples that may be an arbitrary number of bits. Accordingly, the input to the channel element demodulator could be split into multiple signals and combined or multiplexed in different ways. For example, it could be split into an in phase and a quadrature component that would capture the magnitude and phase of a complex baseband signal so there could be more than six physical inputs to the channel element controller, but they would represent signals from typically six logical paths. The input to the channel element controller could also be multiplexed in such a way that, for example, signals from two diversity antennas, i.e., antenna 0 and antenna 1, could be placed on the same physical line. Accordingly, the same physical data channel input to the channel element controller could be multiplexed. DSMs 21-1 through 21-N would be able to accommodate any type of multiplex input requirements for the channel element as well as either in phase in quadrature or real time digital data inputs to the channel element.

On the reverse path, as well as the forward path, of BTS 10, shown in FIGS. 2 and 3, it is possible to aggregate the signals, overhead channels 33-1 through 33-M of FIG. 3 in particular, so that they are transmitted over different sets of beams. In other words, it is possible to change the mapping of beams to sectors such that the overhead channels for a given sector, for example, the alpha sector of a cell may be transmitted over different numbers of beams to effectively change the azimuthal beam width of the sector, as well as the azimuthal angle, or view, of the sector. Accordingly, the present invention operates to effectively shape the coverage of the cell, or coverage of the sectors, by utilizing arbitrary mappings of the overhead channels to various beams. Additionally, the present invention may operate to adjust an azimuth and/or a length of outboard reach of the sectors to shape the coverage of the cell. Beam to sector mapping, as well as adjusting the outboard reach of sectors is taught in U.S. patent entitled "ANTENNA DEPLOYMENT SECTOR CELL SHAPING SYSTEM AND METHOD", previously incorporated herein by reference.

Correspondingly, according to the present invention the received signal inputs from FIG. 2 to the left of bus 19 may be arbitrarily mapped to demodulator channel elements 23-1 through 23-N in such a way that it matches the forward link mapping, the forward link cell shaping that has been created from the mapping of sectors to beam. As such, the present invention may be used to provide for increased capacity in selected regions of the cell by intelligently mapping sectors as described above.

Figure 4:
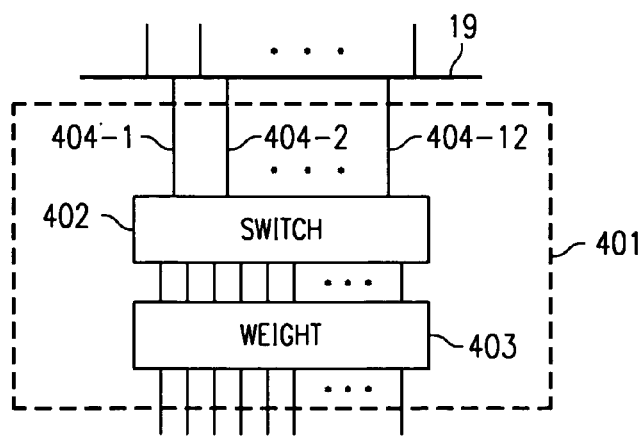
FIG. 4 illustrates a block diagram of a system in the signal path of the base transceiver station of FIG. 1 to dynamically synthesize radiation patterns according to a preferred embodiment of the present invention.

FIG. 4 shows circuitry for dynamic shaping of the beams of the present invention. The shape of a particular beam may be adjusted by adjusting the relative amplitudes and phases of signal components of signals at multiple inputs of an antenna array. The relative phase of the signal components of the signals as provided to antenna elements of a cell site antenna array may be adjusted to change the azimuth of a beam of a multibeam antenna according to the present invention. Similarly, the relative amplitude of the signal components of the signals as provided to antenna elements of a cell site antenna array may be adjusted to change a beam's effective outboard reach or length as referenced in the direction of propagation of the radiation. These amplitudes and phases of the signal components may be adaptively controlled according to communication parameters such as information indicating the quality of communication channels on particular sectors or the number of calls serviced in particular sectors.

Thus, according to this embodiment of the present invention, in the reverse link or path of a preferred embodiment, an adaptive array circuitry 401 is provided as shown in FIG. 4. As shown in FIG. 4, input signals 404-1 through 404-12 are provided to adaptive array circuitry 401. Preferably, these input signals are the twelve logical signals provided from digital bus 19 of FIG. 2, one for each of the beams of the multi-beam antenna. The adaptive array circuitry 401 may comprise a switch circuitry 402 and a weight circuitry 403. The weight circuitry 403 may include phase adjusting circuitry (not shown), such as phase adjusters, adjustable phase shifters, I/Q modulators, Surface Acoustic Wave (SAW) devices, PIN diode circuits and/or the like, such as to provide switched line phase shifting, transmission line phase shifters, and/or the like. The weight circuitry may also include amplitude adjusting circuitry (not shown), such as adjustable attenuators, adjustable amplifiers, stepped attenuators, PIN diode switched attenuators, variable gain stages, and/or the like. The weight circuitry may additionally or alternatively include other circuitry, such as amplifiers like linear power amplifiers, for suitably adjusting signal components of signals as provided to antenna elements to provide the desired beam forming.

The switch circuitry 402 preferably comprises splitters which split the different signals 404-1 through 404-12 into signal components to be provided to appropriate portions of weighting circuitry 403 as discussed below. The switch circuitry 402 also preferably comprises switch modules 20-1 through 20-N as shown in FIG. 2. As discussed with regard to FIG. 2, the switch modules preferably comprise Digital Switch Multiplexers (DSM) 21-1 through 21-N. The DSMs select under decision of the switch decision control units 22-1 through 22-N, the particular antenna elements to which the signal components are to be switched to form the desired beams. The switch modules also include channel elements (CE) 23-1 through 23-N coupled to the DSMs. The CEs despread the signals passed from the DSMs based on the user code or the user code delay. Thereafter, the CEs make a measurement of the signal's interference ratio for each of the inputs, preferably as a function of time delay and then under the supervision of CECs 24-1 through 24-N, demodulate the signal.

The phase adjusting circuitry of the weighting circuitry preferably operates to adjust the relative phases of the different signal components of the signals. A phase progression of the different signal components provided to the antenna elements to form the desired beams may be calculated and the phase adjusting circuitry utilized to adjust the different signal components to provide the calculated phase progression to the different signal components to form the desired beams. Thereafter, the phase of the signal components may be adjusted to change the angle or direction of a beam formed using the signals provided to the antenna elements. Accordingly, the sector azimuth is a function of the relative phases of the signals as provided to antenna columns. Similarly, the amplitude of the signal components may be adjusted in the adaptive array circuitry. Preferably, the amplitude adjusting circuitry of the weighting circuitry is used to adjust the relative amplitudes of the different signal components of the signals. The effective outboard length of a beam is a function of the relative amplitudes of the signals as provided to antenna columns. Moreover, the shape of the beams is also a function of the relative amplitudes of the signals as provided to antenna columns. The outputs of the weighting circuitry are passed on to the cell site controller and in most cases to the switching network cell site processor.

Manual adjustment of the phases and amplitudes of the signal components may be acceptable where, for example, azimuth and/or outboard length are rarely, if ever, changed. However, it is envisioned that the azimuth and/or outboard length of the beams in the present invention will advantageously be adjusted depending on different utilization patterns through any given day or week. Thus, by providing control signals to the switch circuitry 402 and weight circuitry 403 mapping for the different beams may be dynamically achieved.

In order to provide automated manipulation of signal components of the signals of the present invention, a service controller in addition to the switch decision control units is preferably coupled to adaptive array circuitry 401. For example, a service controller adapted to manipulate signals passing through weight circuitry 403 is provided to form desirable radiation patterns for the different channels. It shall be appreciated that the service controller(s) utilized at a particular cell may also be utilized throughout the cellular network, or portions thereof, in order to provide complementary control at multiple cell sites.

The controller receives communication parameters such as information indicating the quality of the communication channel in any particular sector, the interference in the different sectors or the number of calls received in particular sectors. The controller may also receive similar information from other sectors and also other cell sites. Based on this information, the controller may calculate the desired switching and/or phase/amplitude adjustments of the signal components desirable to expand or reduce the azimuthal width and/or the outboard length of a sector and may produce control signals that are fed to switch circuitry 402 and weight circuitry 403. Based on the control signals, switch circuitry 402 may be used to switch particular signals to the desired inputs of weight circuitry 403 for adjustment by the amplitude and/or phase adjusting circuitry or any other circuitry of the weighting circuitry 403, such as power amplifiers, like linear power amplifiers.

In order to provide for beam forming in the forward link or path, an adaptive array circuitry substantially as shown in FIG. 4 for the reverse link or path may be disposed in the forward signal path. The switch circuitry and the weighting circuitry in the forward path would be substantially similar to the switch circuitry and the weight circuitry in the reverse path, except that they would be adapted for use in the forward link or path. Moreover, if desired, the same circuit may be used for both the forward link or path and the reverse link or path. Thus, the same circuit may be used in one direction during a particular time period and in another direction during a different time period thereby facilitating use of the same circuit in both the forward and the reverse paths.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A transmitter system having a plurality of channels associated therewith, said system comprising:
    an antenna having a plurality of transmit signals associated therewith for radiation of at least one output of a plurality of modulation outputs of a transmitter wherein said plurality of transmit signals combine in free space to form a plurality of variable size beams in a radiation pattern;
    means for splitting each of said plurality of modulation transmitter outputs into signal components;
    means for selectively providing select ones of said modulation transmitter output signal components to one or more of said transmit signals, wherein said selectively providing means includes a plurality of independently operable switching means, wherein each of said plurality of independently operable switching means is assigned to a particular channel of said plurality of channels; and
    means for adaptively altering an attribute of ones of said signal components prior to providing to said transmit signals, wherein a size of a beam of said plurality of variable size beams is at least in part defined as a function of a relative difference of said attribute of said signal components as provided to said transmit signals.

2. The system of claim 1, wherein said transmitter is a CDMA transmitter and said plurality of channels are a plurality of CDMA channels.

3. The system of claim 1, wherein said attribute is a phase.

4. The system of claim 1, wherein said attribute is an amplitude.

5. The system of claim 1, wherein said means for adaptively altering is part of an adaptive array circuitry.

6. The system of claim 1, wherein said means for selectively providing is part of an adaptive array circuitry.

7. The system of claim 1, wherein an azimuthal size of each of said variable size beams is a function of a phase differential of signal components as provided to ones of said transmit signals, wherein said phase differential is provided by said means for adaptively altering.

8. The system of claim 1, wherein a longitudinal size of each of said variable size beams is a function of an amplitude differential of signal components as provided to ones of said transmit signals, wherein said amplitude differential is provided by said means for adaptively altering.

9. The system of claim 1, wherein said means for adaptively altering is operable for amplitude adjusting said signal components as provided to ones of said plurality of transmit signals, wherein amplitude adjustment of said signal components of ones of said plurality of transmit signals is operable in part to adjust a longitudinal size of at least a portion of a variable size beam of said plurality of variable size beams.

10. The system of claim 1, wherein said means for adaptively altering is operable for phase adjusting said signal components as provided to ones of said plurality of transmit signals, wherein phase adjustment of said signal components of ones of said plurality of transmit signals is operable in part to adjust an azimuthal size of at least a portion of a variable size beam of said plurality of variable size beams.

11. The system of claim 1, further comprising:
means for independently converting each of said transmit signals to an analog signal.

12. The system of claim 1, further comprising:
means for independently converting each of said transmit signals from an intermediate frequency to a preselected radio frequency.

13. The system of claim 1, further comprising:
means for controlling said selectively providing means, wherein said controlling means provides a control signal to each of said plurality of independently operable switching means to allow each of said modulation transmitter outputs to pass to select ones of said transmit signals.

14. The system of claim 13, wherein said select ones of said transmit signals are selected in part based on channel search data associated with ones of a plurality of receive signals.

15. The system of claim 14, wherein said channel search data is provided by a channel element controller in communication with said controlling means.

16. The system of claim 13, wherein said select ones of said transmit signals are selected in part based on a comparison of measurements of a signal interference ratio of at least a portion of ones of a plurality of receive signals.

17. The system of claim 16, wherein said measurements of said signal interference ratio is provided by a channel element controller in communication with said controlling means.

18. The system of claim 13, wherein said means for controlling substantially automatically controls said means for adaptively altering to provide dynamic size adjustment of ones of said plurality of variable size beams.

19. The system of claim 1, further comprising:
means for substantially automatically controlling said means for adaptively altering to provide dynamic size adjustment of ones of said plurality of variable-size beams.

20. A CDMA receiver system having a plurality of CDMA channels associated therewith, said system comprising:
a multibeam antenna for providing a plurality of variable size beams in a radiation pattern having a plurality of beam receive signals associated therewith;
a CDMA receiver, wherein said CDMA receiver includes a plurality of demodulation inputs;
a switch bank for selectively providing signal components of select ones of said plurality of receive signals to one or more of said plurality of demodulation inputs, wherein said switch bank includes a plurality of independently operable switching circuits, wherein each of said plurality of independently operable switching circuits is assigned to a different channel of said plurality of CDMA channels; and means for adaptively altering an attribute of select ones of said signal components of select ones of said receive signals prior to providing to said demodulation inputs, wherein a relative difference of said attribute of said signal components of ones of said receive signals at least in part defines a beam of said plurality of variable size beams.

21. The system of claim 20, wherein said means for adaptively altering is part of an adaptive array circuitry.

22. The system of claim 20, wherein said switch bank is part of an adaptive array circuitry.

23. The system of claim 20, wherein said switch bank is a baseband receive switch bank.

24. The system of claim 20, wherein said attribute is a phase.

25. The system of claim 20, wherein said attribute is an amplitude.

26. The system of claim 20, wherein said means for adaptively altering comprises phase adjusting circuitry for adjusting a phase of said signal components of ones of said receive signals.

27. The system of claim 20, wherein said means for adaptively altering comprises amplitude adjusting circuitry for adjusting an amplitude of said signal components of ones of said receive signals.

28. The system of claim 20, wherein ones of said plurality of independently operable switching circuits of said switch bank comprise a digital switch multiplexer.

29. The system of claim 28, wherein said digital switch multiplexers are each coupled to a different channel element of said CDMA receiver.

30. The system of claim 20, wherein an azimuthal size of each of said variable size beams is a function of a phase differential of signal components of ones of said receive signals, wherein said phase differential is provided by said means for adaptively altering.

31. The system of claim 20, wherein each of said plurality of independently operable switching circuits can access each of said plurality of receive signals.

32. The system of claim 20, further comprising:
means for controlling said switch bank, wherein said controlling means provides a control signal to each of said plurality of independently operable switching circuits to allow select ones of said receive signals to pass to a demodulation input of said plurality of demodulation inputs.

33. The system of claim 20, further comprising:
means for independently converting each of said receive signals from a received radio frequency to a preselected intermediate frequency.

34. The system of claim 20, further comprising:
means for independently converting each of said receive signals from an analog signal to a digital signal.

35. A method for utilizing a multi-beam antenna with a CDMA base transceiver station having a plurality of CDMA channels associated therewith, for providing a plurality of variable size beams in a radiation pattern, said method comprising the steps of:
providing a plurality of receive signals for input into a demodulation receiver having a plurality of inputs;
providing a plurality of transmit signals for radiation of at least one output signal from a modulation transmitter having a plurality of outputs, wherein said plurality of transmit signals combine in free space to form said plurality of variable size beams;
selectively providing signal components of ones of said receive signals to ones of said demodulation receiver inputs, wherein said selectively providing step utilizes a plurality of independently operable input switching circuits each assigned to a different one of said CDMA channels;

selectively providing signal components of said at least one output signal to select ones of said transmit signals, wherein said selectively providing step utilizes a plurality of independently operable output switching circuits each assigned to a different one of said CDMA channels;

adaptively altering an attribute of select signal components of ones of said receive signals prior to providing to said demodulation receiver inputs, wherein a relative difference of said attribute of said signal components of ones of said receive signals at least in part defines a beam of said plurality of variable size beams; and adaptively altering an attribute of ones of said signal components of said at least one output signal prior to providing to said transmit signals, wherein a relative difference of said attribute of said signal components at least in part defines a beam of said plurality of variable size beams.

36. The system of claim 35, further comprising the step of:

controlling said input switching circuits as a function of channel search data associated with ones of said receive signals.

37. The system of claim 35, further comprising the step of:

controlling said output switching circuits as a function of channel search data associated with ones of said transmit signals.

38. The system of claim 35, further comprising the step of:

providing a control signal to each of said plurality of independently operable output switching circuits to allow select ones of said modulation transmitter outputs to pass to ones of said transmit signals.

39. The system of claim 35, further comprising the step of:

providing a control signal to each of said plurality of independently operable input switching circuits to allow select ones of said receive signals to pass to a demodulation input of said plurality of demodulation receiver inputs.

40. The system of claim 35, wherein said attribute is a phase.

41. The system of claim 35, wherein said attribute is an amplitude.

42. The system of claim 35, wherein an azimuthal size of each of said variable size beams is a function of a phase differential of signal components of said transmit signals.

43. The system of claim 35, wherein a longitudinal size of each of said variable size beams is a function of an amplitude differential of signal components of said transmit signals.

44. The method of claim 35, further comprising the steps of:

converting said receive signals from a radio frequency to an intermediate frequency; and converting said receive signals from an analogue signal to a digital signal.

45. The method of claim 35, further comprising the steps of:

converting said transmit signals from a digital signal to an analogue signal; and converting said transmit signals from an intermediate frequency to a radio frequency.

* * * * *